(12) United States Patent
Okuley et al.

(10) Patent No.: US 9,176,528 B2
(45) Date of Patent: Nov. 3, 2015

(54) DISPLAY DEVICE HAVING MULTI-MODE VIRTUAL BEZEL

(71) Applicant: INTEL CORPORATION, Santa Clara, CA (US)

(72) Inventors: James M. Okuley, Portland, OR (US); Hong W. Wong, Portland, OR (US); Peter S. Adamson, Santa Clara, CA (US); John M. Valavi, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 173 days.

(21) Appl. No.: 13/730,547

(22) Filed: Dec. 28, 2012

(65) Prior Publication Data
US 2014/0184512 A1 Jul. 3, 2014

(51) Int. Cl.
*G06F 3/041* (2006.01)
*G06F 1/16* (2006.01)
*G06F 3/0488* (2013.01)
*G06F 3/14* (2006.01)

(52) U.S. Cl.
CPC ............ *G06F 1/1626* (2013.01); *G06F 1/1643* (2013.01); *G06F 1/1669* (2013.01); *G06F 3/0488* (2013.01); *G06F 3/1454* (2013.01); *G06F 2203/04803* (2013.01)

(58) Field of Classification Search
CPC ....................................... G06F 3/041–3/04897
See application file for complete search history.

(56) References Cited

U.S. PATENT DOCUMENTS

| | | |
|---|---|---|
| 2003/0198008 A1 | 10/2003 | Leapman et al. |
| 2006/0197753 A1 | 9/2006 | Hotelling |
| 2011/0163969 A1* | 7/2011 | Anzures et al. ............... 345/173 |
| 2014/0055367 A1* | 2/2014 | Dearman et al. ............. 345/173 |

FOREIGN PATENT DOCUMENTS

| | | |
|---|---|---|
| KR | 10-2007-0079519 | 8/2007 |
| KR | 10-2012-042799 | 5/2012 |
| TW | 201209700 A | 3/2012 |
| TW | 201246087 A | 11/2012 |
| WO | WO 2011-068396 | 6/2011 |
| WO | WO 2012-127118 | 9/2012 |
| WO | 2014/105240 A1 | 7/2014 |

OTHER PUBLICATIONS

International Search Report and Written Opinion for Application PCT/US2013/062329 dated Jan. 20, 2014.
International Search Report dated May 19, 2015.
Taiwanese Office Action issued in Application No. 102147470 dated May 21, 2015.

* cited by examiner

*Primary Examiner* — Yong H Sim
(74) *Attorney, Agent, or Firm* — KED & Associates LLP (57) ABSTRACT

A computing device may include a touch-sensitive display. Display logic may control a size of an active area of the touch-sensitive display and a size of an inactive area of the touch-sensitive display. The display logic to set the active area to a first size when the touch-sensitive display is in a first mode. Display logic to set the active area to a second size when the touch-sensitive display is in a second mode. In one embodiment, the computing device may be a convertible computer system. In another embodiment, the computing device may be a tablet computer system.

20 Claims, 7 Drawing Sheets

DISPLAY DEVICE HAVING MULTI-MODE VIRTUAL BEZEL

BACKGROUND

1. Field

Embodiments may relate to a display device having a multi-mode virtual bezel (or inactive area).

2. Background

Electronic devices include tablet-type computer system (or computing device) in which a tablet may couple to a base, and may detach from the base. Electronic devices may also include a convertible computing device that may convert from a clamshell mode to a tablet mode.

BRIEF DESCRIPTION OF THE DRAWINGS

Arrangements and embodiments may be described in detail with reference to the following drawings in which like reference numerals refer to like elements and wherein.

DETAILED DESCRIPTION

In the following detailed description, like numerals and characters may be used to designate identical, corresponding and/or similar components in differing figure drawings. Further, in the detailed description to follow, example sizes/models/values/ranges may be given although embodiments are not limited to the same. Where specific details are set forth in order to describe example embodiments, it should be apparent to one skilled in the art that embodiments may be practiced without these specific details.

Embodiments may relate to a tablet type computer system in which a tablet may be separated or detached from a base of the tablet type computer system. The tablet may operate in different modes depending on whether the tablet is physically coupled to the base or not. For example, the tablet may operate in a clamshell mode when the tablet is physically coupled to the base. On the other hand, the tablet may operate in a tablet mode when the tablet is not physically coupled to the base.

The tablet may include a display having a touchscreen or a touch-sensitive display. The touch-sensitive display (or touchscreen) may include an active area and an inactive area. The active area may be an area that receives a touch input and a component of the tablet responds to the touch input (such as via the display). The inactive area may be an area of the touch-sensitive display (or touchscreen) that does not respond to a touch input. In other words, even though the touch input is provided to the inactive area, the tablet may not change the display or perform any other action. The tablet may appear as if the touch input (to the inactive area) is not recognized by the tablet.

Embodiments may also be applicable to a convertible computing device that may convert between a clamshell mode and a tablet mode. In the convertible computing device, the lid or display may be called a tablet or tablet display (that includes a touch-sensitive display). However, in the convertible computing device the tablet display (or lid) may not detach from the base.

Embodiments may relate to controlling an active area (or active display area) of the touch-sensitive display (or touchscreen), such as based on the operational mode of the tablet or based on a user input. For example, in the clamshell mode, the touch-sensitive display (or touchscreen) may have a large active area (or large display area) as compared to when in the tablet mode in which the touch-sensitive display (or touchscreen) may have a small active area (or small display area). A size of the inactive area (or virtual bezel) of the touch-sensitive display (or touchscreen) may also change based on the changed size of the active area. This may allow a user to more easily hold the tablet while accidently touching the active area.

The inactive area may be called a virtual bezel, which is a bezel area that decreases or increases in size by changing the active display area of the device.

A user may hold a tablet in their hands. As such, when using a touch enabled tablet, a large bezel area may be desired so that the user may not block the display area (or active display area) or cause inadvertent touch events while holding the tablet. However, when in the clamshell mode, the bezel may no longer be needed and it may be desirable to have as small a bezel as possible to maximize the active display area. In an electronic device that is operates in both a tablet mode and a clamshell mode (e.g. a detachable tablet or convertible laptop), a virtual bezel may provide an optimal display area depending on how the electronic device is being used.

The virtual bezel may be an adjustable color border around the outer edge of the display. By increasing or decreasing the border around the display, the display may appear to change sizes. The change in pixel size may be performed by displays hardware and/or operating system (OS) driver, so the OS may not be affected by the physical change in display area size.

Embodiments may provide a computing device that include a touch-sensitive display and display logic at least a portion of which is hardware. This display logic may control a size of the active area of the touch-sensitive display and a size of an inactive area of the touch-sensitive display. This display logic may further set the active area to a first size when the touch-sensitive display is in a first mode. The display logic may still further set the active area to a second size when the touch-sensitive display is in a second mode.

Additionally, the first mode may include a first housing of a base and a second housing of the touch-sensitive display in a detached configuration. The second mode may include the first housing and the second housing in a coupled configuration.

As discussed hereinafter, various operations may be performed by a touchscreen display, a touch-sensitive display or a tablet. These operations may be performed by display logic at least a portion of which is hardware.

Figure 1:
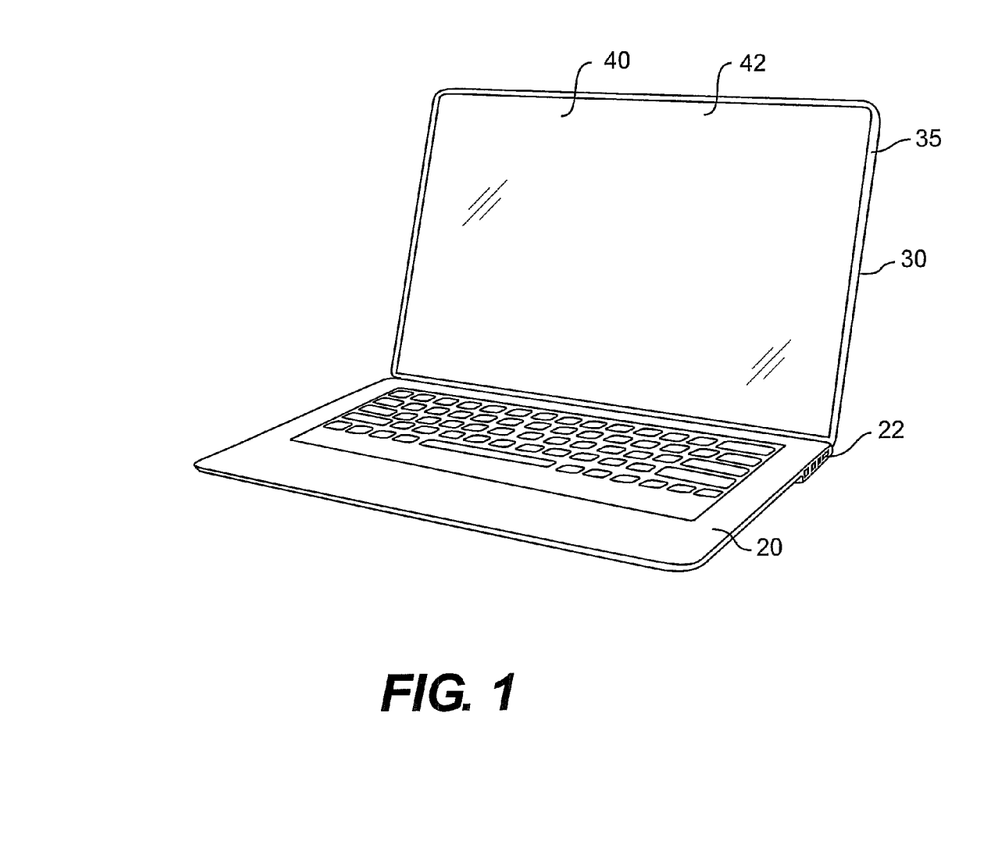
FIG. 1 is a front perspective view of an electronic device according to example embodiment.

FIG. 1 is a front perspective view of an electronic device according to an example embodiment. Other embodiments and configurations may also be provided.

The electronic device may be a tablet type computer system in which a tablet may be detachable from other components of the device, such as a base.

FIG. 1 shows an electronic device 10 (such as a tablet computer system) that may include a base 20 and a tablet 30. The tablet 30 may be called a detachable tablet. The tablet 30 may include a touch-sensitive display and display logic at least a portion of which is hardware. The tablet 30 may also be called a lid, which may be coupled to or detached from the base 20 via a coupling device. In the convertible computing device, the lid (or tablet display) may not detach from the base.

The base 20 may include a first housing, a keyboard 60 and other electronic components. The base 20 may include an area 22 of enhanced thickness at a rear portion thereof. The area 22 of enhanced thickness may be configured to house electronics therein.

The tablet 30 may include at least a second housing, a display 40, a processor, a graphic driver, a Wi-Fi component, a memory and a battery, for example. Other components may also be provided on or at the tablet 30.

FIG. 1 shows the base 20 and the tablet 30 in a clamshell mode in which at least an edge of the second housing of the tablet 30 and an edge of the first housing of the base 20 may be physically coupled together.

The tablet 30 may be attached to the base 20 by a coupling device. More specifically, at least an edge of the first housing may be coupled to an edge of the second housing by the coupling device. The coupling device may include a power connector, a data connector, a mechanical connector and/or a docking connector. The coupling device may also be a mechanical hinge. The tablet 30 may therefore be able to obtain power and/or data from the base 20 via the connectors. In at least one embodiment, the coupling device may be provided on the base 20. In at least another embodiment, the coupling device may include connectors on both the tablet 30 and the base 20.

The tablet 30 may detach from the base 20. Upon detecting the detachment, the tablet 30 may enter a tablet mode in which the tablet 30 is self-sufficient. The battery of the tablet 30 may supply power to the tablet 30 when the tablet 30 is not electrically connected to a power source (i.e., in the tablet mode). For a convertible computing device, sensors may be provided on the lid (or tablet display) and/or the base, and the sensors may sense the system operational mode (i.e., tablet mode or clamshell mode). This information may allow the system to set the virtual bezel to be on or off.

The display 40 may be a liquid crystal display (LCD), for example, provided within an edge 35 of the tablet 30. The display 40 may include a touch-sensitive display or touchscreen having an active area and an inactive area. The active area may also be considered an active display area. The pixels corresponding to the active area may emit light or may be turned on. The inactive area may be considered a virtual bezel in which a single color, such as black or tan, may be displayed. The non-display area may be an area that does not display objects or widgets, for example. The single color of the virtual bezel may help distinguish the inactive area from the active area. In at least one embodiment, pixels corresponding to the inactive area may be black by the pixels being turned off.

A size of the active area and a size of the inactive area may depend on an operation mode of the tablet 30, for example. For example, while in a clamshell mode as shown in FIG. 1, a first active area 42 of the touch-sensitive display (of the display 40) may correspond to substantially all of the display 40. The first active area 42 of the touch-sensitive display may extend up to the edge 35 of the tablet 30, although other dimensions of the first active area 42 may be provided.

FIG. 1 shows the first active area 42 of the display 40 covering almost all of a front surface of the display 40, and thus an inactive area is not easily seen. The active area is an area of the display 40 that will accept a touch input and the tablet 30 will respond with some action or operation, such as a change of display. The inactive area is an area of the display 40 that will not respond with some action or operation based on the touch input directly in the inactive area.

Figure 2:
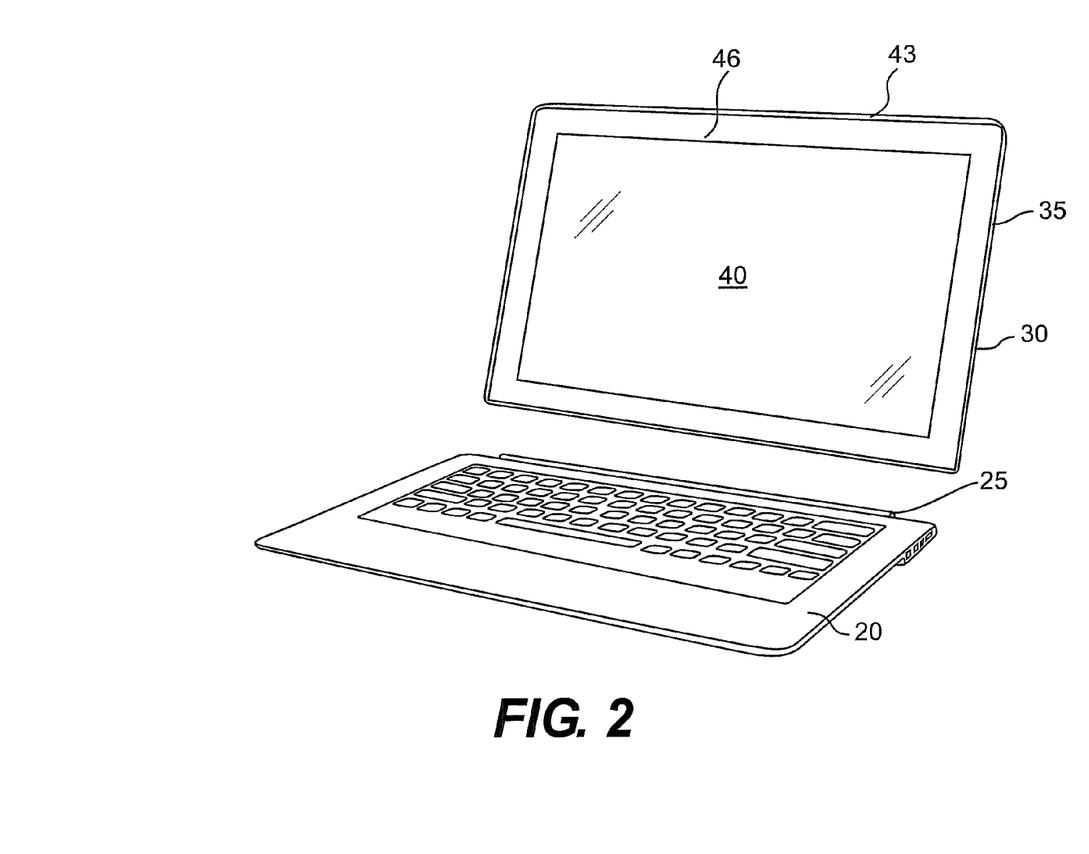
FIG. 2 is a front perspective view of an electronic device according to an example embodiment.

FIG. 2 is a front perspective view of an electronic device according to an example embodiment. Other embodiments and configurations may also be provided.

More specifically, FIG. 2 shows the tablet 30 separated from the base 20. FIG. 2 also shows a coupling device 25 provided on a housing of the base 20. The coupling device 25 may be a groove that allows an edge of the housing of the lid 30 to be coupled to an edge of the housing of the base 20. The coupling device may also include a power connector, a data connector, a mechanical connector, a docking connector, a docking latch mechanism and/or a hinge. This may allow components in the base to be interfaced to the lid or tablet display. Components of the base 20 may include a first housing, a keyboard, a secondary battery, a direct current (DC) in jack and/or USB connectors on the base.

FIG. 2 shows the tablet 30 in the tablet mode in which the housing of the tablet 30 is detached from the housing of the base 20. In the tablet mode, display logic of the tablet 30 may change a size of the active area and/or a size of the inactive area. For example, while in a tablet mode, the display 40 may include a second active area 43 (or display area) and an inactive area 46 (or virtual bezel). The second active area 43 of the display 40 may be smaller than the first active area 42 of the display 40. The inactive area 46 may be provided on the display 40 between the second active area 43 and the edge 35 of the tablet 30. The inactive area 46 may create a virtual bezel that surrounds the second active area 43.

Figure 3:
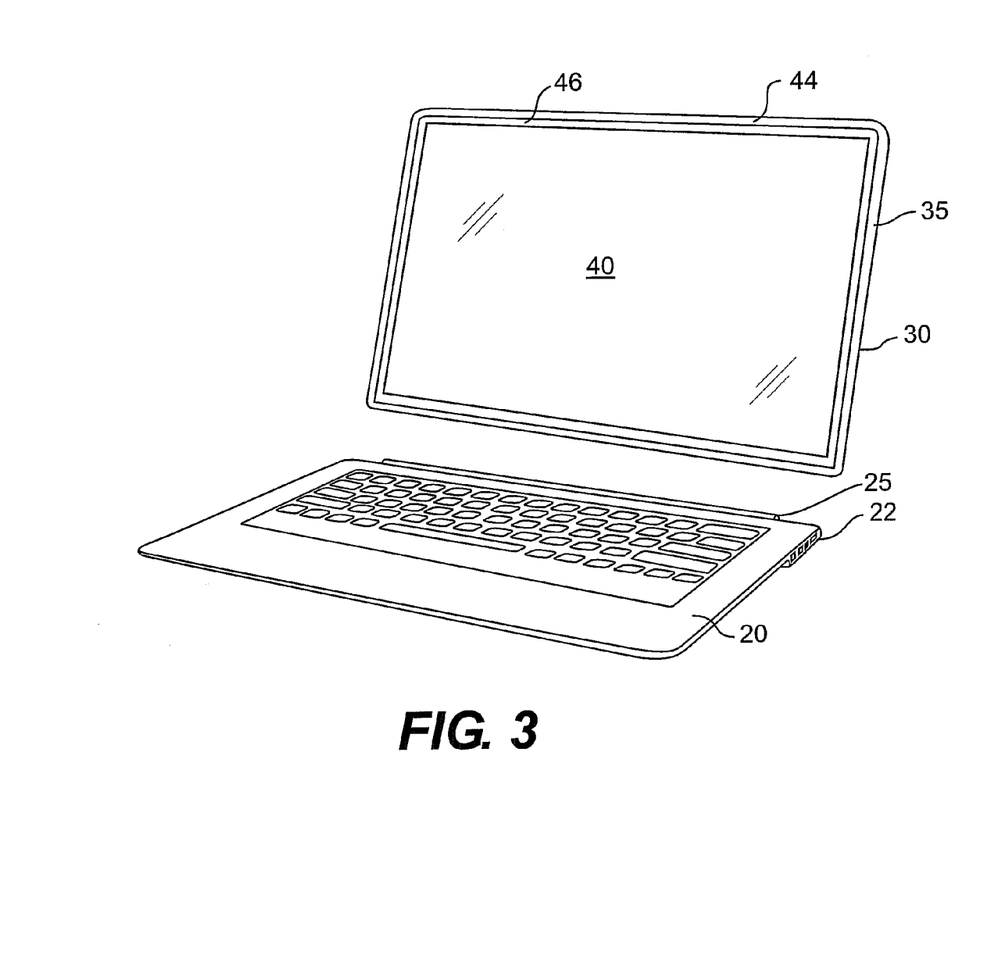
FIG. 3 is a front perspective view of an electronic device according to an example embodiment.

FIG. 3 is a front perspective view of an electronic device according to an example embodiment. Other embodiments and configurations may also be provided.

More specifically, FIG. 3 shows the tablet 30 separated from the base 20. FIG. 3 shows the tablet 30 in a tablet mode in which the tablet 30 is detached from the base 20. In this embodiment, the display logic may display a third active area 44 (or display area) without an inactive area or with a small inactive bezel. The third active area 44 of the display 40 may be the same as or smaller than the first active area 42 of the display 40, and the third active area 44 may be larger than the second active area 43.

In another embodiment, an inactive area may be provided between the second active area 44 and the edge 35 of the tablet 30.

Display logic may also display a dynamic button (or virtual key) on the touch-sensitive display in order to perform an operation. The button may correspond to a specific area of the touch-sensitive display that may recognize a touch input to the button. The button may correspond to a specific function such as changing an orientation of the display (such as from portrait to landscape), changing a size of the active area, and/or other functions of the display. The button may appear to be displayed in the virtual bezel, although it is an active component of the touch-sensitive display. The active button may be surrounded by the inactive area.

Figure 4A:
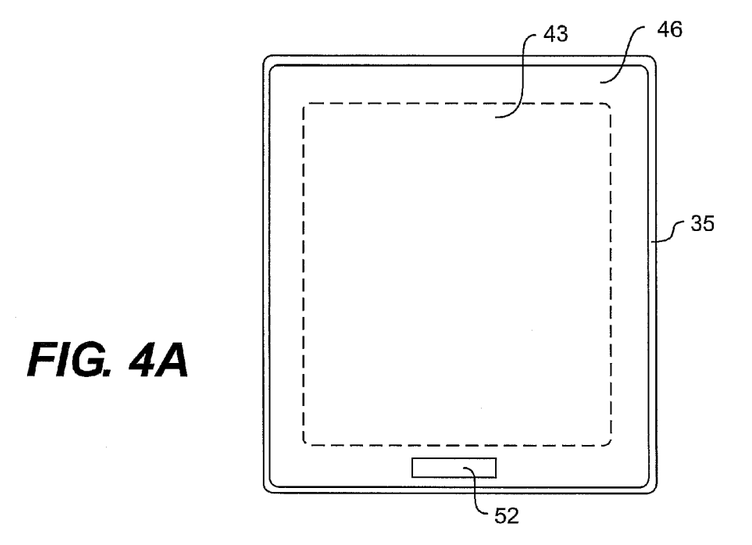
FIGS. 4A-4B are front views of a tablet according to an example embodiment.
Figure 4B:
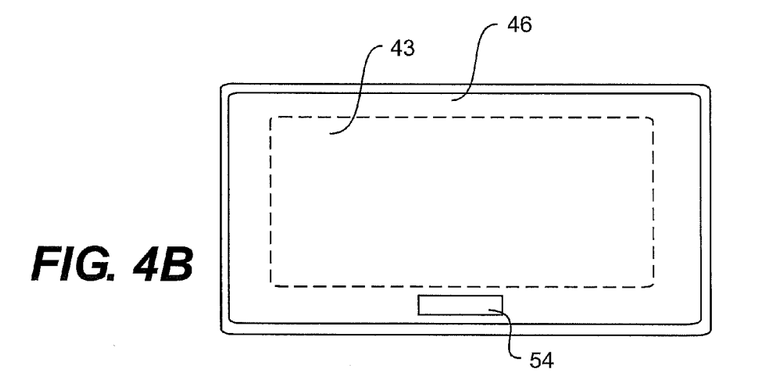

FIGS. 4A-4B are front perspective views of an electronic device according to an example embodiment. Other embodiments and configurations may also be provided.

More specifically, FIG. 4A shows the display logic of the tablet 30 (in a tablet mode) provides the display 40 in a portrait view. The portrait view may be a view of an image having a height that is greater than a width. FIG. 4B shows the display logic of the tablet 30 (in the tablet mode) provides the display 40 in a landscape view. The landscape view may be a view having a width that is greater than a height. The view may be based on an orientation of the tablet and/or based on a touch input to a button (or virtual button) displayed on the display 40.

FIG. 4A shows the display logic displays a button 52 (or key) provided at a specific area of the display 40. For example, the button 52 may be provided in a lower center area of the display 40 when the tablet 30 is displaying an image in the portrait view. The button 52 may be to perform any of a number of operations of the tablet 30 based on a touch input. The button 52 may appear to be in the inactive area 46; however, since an operation may occur based on a touch input to the button 52, the button 52 may be considered as being in an active area of the touchscreen.

FIG. 4B shows the display logic displays a button 54 (or key) provided at a specific area of the display 40. For example, the button 54 may be provided in a lower center area of the display 40 when the tablet 30 is displaying an image in the landscape view. The button 54 may be to perform any of a number of operations of the tablet 30 based on a touch input. The operations may be performed by the display logic. The button 54 may appear to be in the inactive area 46; however, since an operation may occur based on a touch input to the button 54, the button 54 may be considered as being displayed in an active area of the touchscreen.

The computing device may include sensors to determine if the display is in portrait or landscape mode. The buttons 52, 54 may become active depending on an orientation of the display. This may be performed by display logic. Further, backlights under the buttons 52, 54 may be illuminated accordingly to indicate to the user when the corresponding button is active and can support a user input.

In at least one embodiment, display logic may center justify the active area with a bottom of the display.

In at least one embodiment, display logic may cause the touch-sensitive display to change the size of the active area based on an input from the group consisting of a keypad, a touchpad, a key and a touch point nub.

Figure 5:
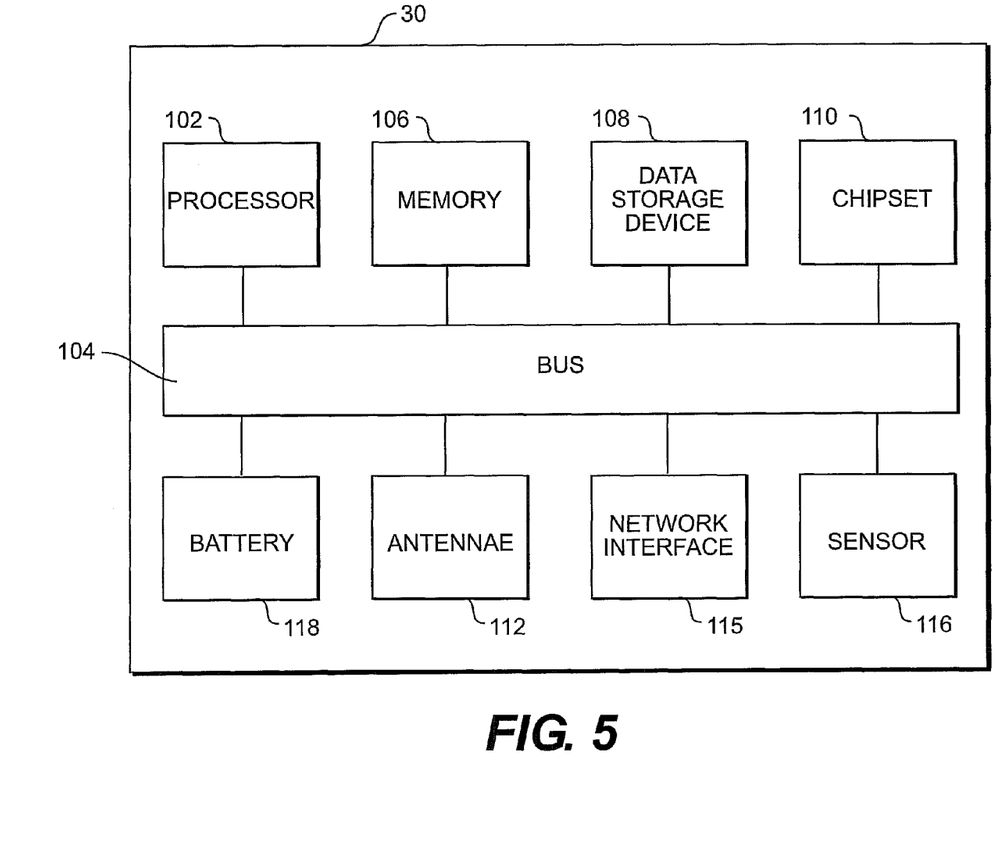
FIG. 5 is a block diagram of a tablet according to an example embodiment.

FIG. 5 illustrates a block diagram of a tablet according to an embodiment. Other embodiments and configurations may also be provided. Display logic may include components with the tablet shown in FIG. 5.

The tablet 30 may include a processor 102 coupled to a bus 104. While the tablet 30 is shown with a single processor 102, the tablet 30 may have multiple processors or the processor 102 may have multiple cores.

A memory 106 may also be coupled to the bus 104 and may store data and sequences of instructions that are executed by the processor 102 or any other device included in the tablet 30. The memory 106 may include random access memory (RAM), read only memory (ROM), and/or other type of memory. A data storage device 108 may also be coupled to the bus 104 to store information and instructions. The data storage device 108 may include a magnetic disk (e.g., a hard disk), an optical disc (e.g., a CD-ROM) and/or a digital versatile disc (DVD), etc. The tablet 30 may further include a chipset 110. The chipset 110 may include a graphics controller and an input/output (I/O) controller. The graphics controller may manage information to be displayed on the display 40 of the tablet 30. The I/O controller may manage I/O devices (e.g., game controller, mouse, etc.) that may be connected to the tablet 30. An antenna 112 and/or a network interface may also be connected to the bus 104 to provide via wireless and/or wireless connections, respectively, access to a network, such as a personal area network, local area network and/or wide area network.

Instructions executed by the processor 102 may be provided to the memory 106 from a machine-accessible medium, or an external storage device accessible via a remote connection (e.g., over a network via the antenna 112 and/or the network interface 115) providing access to one or more electronically-accessible media, etc. A machine-accessible medium may include any mechanism that provides (i.e., stores and/or transmits) information in a form readable by a machine (e.g., a computer or a processor). For example, a machine-accessible medium may include RAM, ROM, magnetic or optical storage medium, flash memory devices, electrical, optical, acoustical or other form of propagated signals (e.g., carrier waves, infrared signals, digital signals); etc. In an alternative embodiment, hard-wired circuitry may be used in place of or in combination with the instructions, and thus embodiments are not limited to any specific combination of hardware circuitry and software instructions.

The tablet 30 may include a sensor(s) 116, such as an accelerometer, a proximity sensor and/or a depth sensor. The sensor(s) 116 may sense a touch input to the display 40 or a proximate touch to the display 40. The sensor(s) may also sense orientation of the display 40 and activate the buttons 52 or 54 and associated backlights for the buttons 52, 54.

The tablet 30 may also include a battery 118 and/or a power supply to power the components of the tablet 30.

The memory 106 may store data, such as programs, application, software, etc. The memory 106 may store an algorithm or instructions to control the display 40. For example, the memory 106 may store an algorithm or instructions to control a size of the active area and a size of the inactive area.

Various functions of embodiments as described herein may be implemented using one or more of these hardware systems, and/or instructions or routines that may be executed by one or more executions units, such as the processor 102, within the hardware systems. Machine executable instructions may be stored using any machine readable storage medium including internal memory, such as the memory 106, as well as various external and internal memories, such as a hard drive, diskette, CD-ROM, magnetic tape, digital video or versatile disk (DVD), laser disk, Flash memory, a server on a network, etc.

In an alternative embodiment, various functions of embodiments may be implemented in discrete hardware or firmware (or hardware logic). For example, one or more application specific integrated circuits (ASICs) may be programmed with one or more of the above described functions. In another example, one or more functions may be implemented in one or more ASICs on additional circuit boards and the circuit boards may be inserted into the tablet 30 described above. In another example, one or more programmable gate arrays (PGAs) may be used to implement one or more functions. In yet another example, a combination of hardware and software may be used to implement one or more functions of embodiments.

Embodiments may provide a tablet in which a size of a virtual bezel may change based on display logic at least a portion of which is hardware. In at least one embodiment, when the tablet 30 enters the tablet mode (as shown in FIG. 2), then the display logic may decrease a size of the active area of the display 40 as compared to the size of the active area of the display 40 in the clamshell mode (as shown in FIG. 1).

Embodiments may allow a user to control a size of the active area and the inactive area by changing a setting of the tablet 30. The settings may also be pre-set to the tablet 30.

As one example, when the housing of the tablet 30 is physically connected to the housing of the base 20, then the active area (or the active display area) may extend to the edge 35 of the tablet 30, and thereby the inactive area (or the virtual bezel) may disappear or be minimized. This may allow use of a maximum size of the display 40. When the user removes the tablet 30 from the base 20 (or when the tablet 30 enters the tablet mode), then the inactive area (or the virtual bezel) may appear and the active area (or the active display area) may be reduced to allow the user to hold the tablet 30 at the inactive area (i.e., the virtual bezel) without an accidental touch input.

Display logic may provide that the inactive area (or the virtual bezel) to disappear automatically during specific applications. For example, if a user desires to watch a video on the tablet 30 while in the tablet mode, then the display logic may expand the active area (or the active display area), such as shown in FIG. 3.

The sensor 116 (or the sensors), such as an accelerometer, may detect when a user is holding the tablet 30. Upon sensing a holding of the tablet 30, the controller 104 of the tablet 30 may switch the display 40 to a different mode or view.

Additionally, a proximity sensor or a depth sensor may detect when a user's hand is approaching the tablet 30. Based on the sensed detection, the controller 104 (or display logic) may automatically provide the inactive area (or the virtual bezel) to allow the user to adjust a tablet angle relative to the base 20 or to remove the tablet 30 from the base 20, for example.

In at least one embodiment, the active area (or active display area) of the display 40 may shrink for the tablet mode (i.e., larger bezel), and touch over the display pixels that make up the virtual bezel (or inactive area) may not be sent to the operating system (OS). This may be performed by display logic. Touches over the smaller display area or active area may be remapped to new touch coordinates since the active display area has changed underneath the touch screen. The change in size of the virtual bezel may be triggered physically (i.e., when the tablet 30 is removed from the base or the dock or the convertible changes to the tablet mode) or based on sensors (certain rotations of the device or when the tablet 30 is grabbed a certain way). This trigger may involve the user grabbing the entire display 40 in order to manipulate it, and a touch may be momentarily disabled on the entire device while changing bezel sizes to avoid inadvertent touch events. Touch may be either re-enabled when the transition is complete, mechanically (tablet is re-attached) or by the user touching a specific area on the device.

Figure 6:
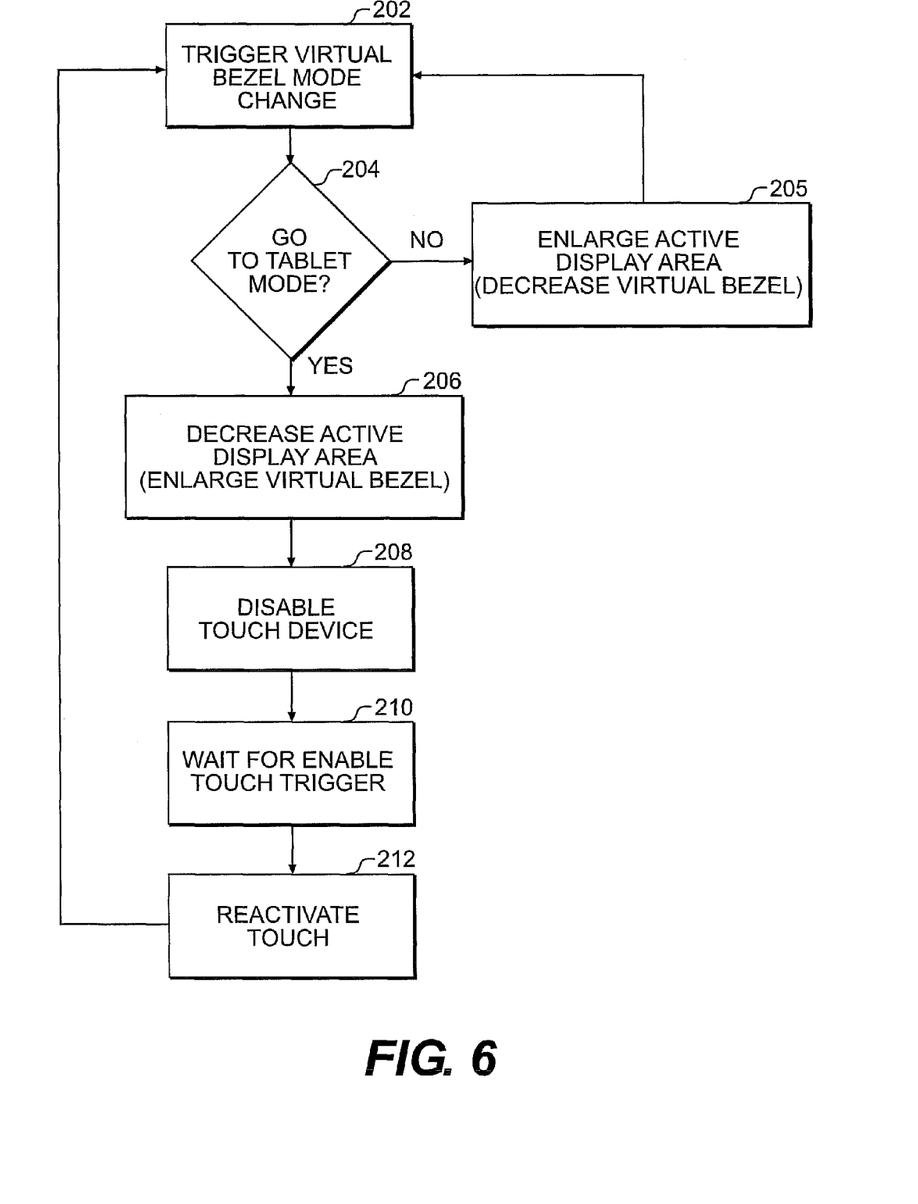
FIG. 6 is a flowchart showing virtual bezel transition logic.

FIG. 6 is a flowchart showing virtual bezel transition logic according to an example embodiment. Other embodiments, operations and other orders of operations may also be provided.

More specifically, in operation 202, a virtual bezel mode change may be triggered. In operation 205, a determination may be made regarding whether the tablet display (or touch-sensitive display) should go to a tablet mode.

If the determination is NO in operation 204, then in operation 205, the active display area may be enlarged and the virtual bezel area may be decreased. Operations may then proceed to operation 202.

If the determination is YES in operation 204, then in operation 206, the active display area may be decreased and the virtual bezel area may be enlarged. In operation 208, the touch device may be disabled. Operation 210, the tablet display (or touch-sensitive display) may wait for a touch trigger to be enabled. In operation 212, the touch may be reactivated. Operations may then proceed to operation 202.

When the virtual bezel (or inactive area) increases during the tablet mode (and the active display area decreases in size), embodiments may take advantage of that dead display area and the display logic may display custom buttons that are sensitive but still displayable surrounded by the inactive area. Placement, look and behavior of the dynamic button(s) may be provided anywhere in the virtual bezel (or the inactive area). The buttons may replace keyboard keys or may be used for macros commands such as an airplane mode to disable all wireless functions. The buttons may permit common system actions (such as volume control, display brightness, etc.) to always be accessible to the user independent of the normal display area controlled by the operating system. Buttons may be activated (such as by display logic) to serve as shortcuts without consuming space in the application's client window area.

When the device is rotated (which normally changes the display orientation), the display logic may automatically move the buttons to new areas in the virtual bezel. The buttons may be hidden or moved based on user preferences. Touches on the outside of the touch sensitive area must be processed based on the virtual bezel state and placement of dynamic buttons.

Figure 7:
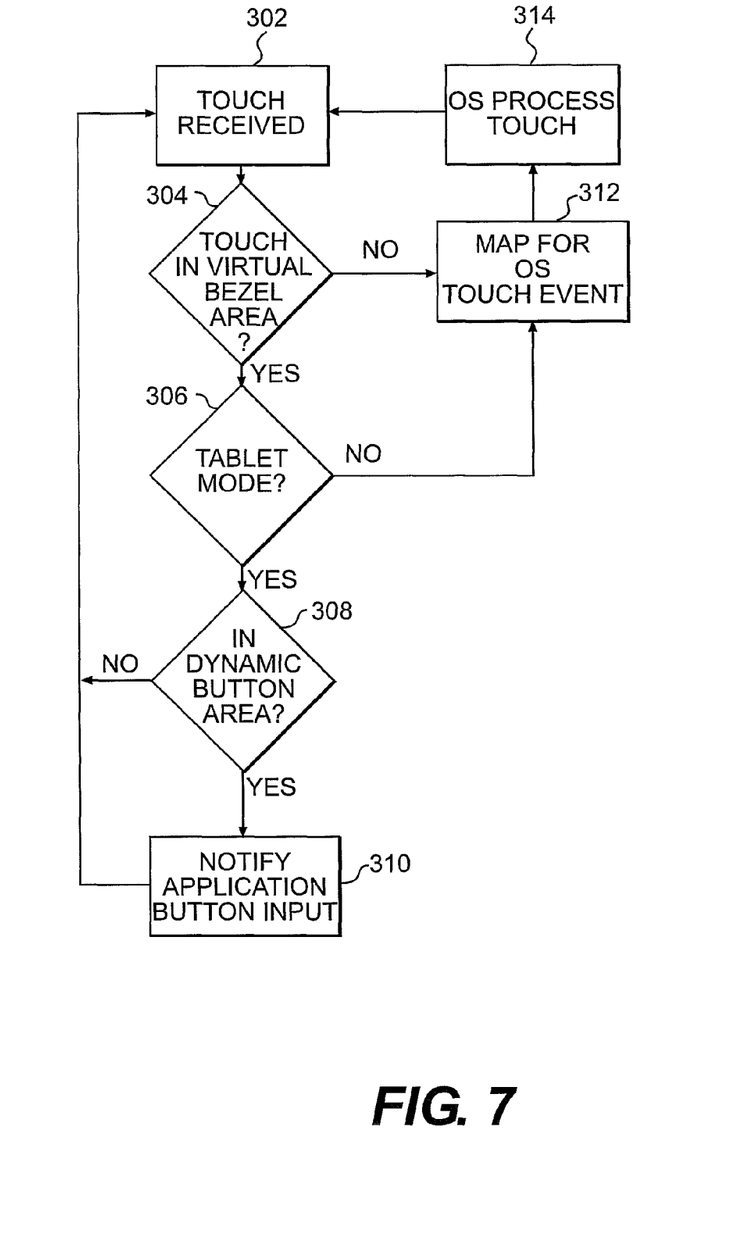
FIG. 7 is a flowchart showing a bezel touch.

FIG. 7 shows a logic flow for a bezel touch according to an example embodiment. Other embodiments, operations and orders of operations may also be provided.

A touch in the virtual bezel area may be a regular touch on the display (clamshell or small virtual bezel mode), a touch in the bezel that is ignored (tablet or large bezel mode) or a dynamic button touch (tablet bezel mode).

In operation 302, a touch may be received. In operation 304, a determination may be made by display logic regarding whether the touch is in the virtual bezel area.

If the determination is NO in operation 304, then in operation 312, then the operating system may map the event as a touch event. In operation 314, the operating system may process the touch event. Operations may then proceed to operation 302.

If the determination is YES in operation 304, then in operation 306 a determination may be made by display logic whether the device is in a tablet mode.

If the determination is NO in operation 306, then operations may proceed to operation 312.

If the determination is YES in operation 306, then in operation 308, a determination may be made by display logic regarding whether a touch is to a dynamic button area. IF the determination is NO in operation 308, then operations may proceed to operation 302.

If the determination is YES in operation 310, then the operating system may be notified of an application button input.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A computing device comprising:
   a touch-sensitive display having four edges, a first edge being opposite to a second edge, and a third edge being opposite to a fourth edge; and
   display logic at least a portion of which is hardware, the display logic to:
      detect detachment of the touch-sensitive display from a base;
      control a size of an active area of the touch-sensitive display and a size of an inactive area of the touch-sensitive display based on the detected detachment of the touch-sensitive display from the base;
      set the active area to a first size when the touch-sensitive display is connected to the base in a first mode;
      set the active area to a second size when the touch-sensitive display is detected to be detached from the base and provided into a second mode;
      cause the touch-sensitive display to display an active button at an area adjacent the first edge,
      change the size of the active area in response to a user input to the touch-sensitive display at a location of the active button, and
      change a location of the active button to be at an area adjacent the third edge based on a change of orientation of the touch-sensitive display, and the active button to be surrounded by the inactive area of the touch-sensitive display when the active button is at the area adjacent the third edge.

2. The computing device of claim 1, further comprising:
   a base including:
      a keyboard; and
      a first housing, and
   the touch-sensitive display further including a second housing, wherein at least an edge of the first housing and an edge of the second housing are detachably coupled.

3. The computing device of claim 2, wherein the first mode comprises the first housing and the second housing in a coupled configuration, and the second mode comprises the first housing and the second housing in a detached configuration.

4. The computing device of claim 1, wherein the first size of the active area is greater than the second size of the active area.

5. The computing device of claim 1, wherein the inactive area of the touch-sensitive display is a virtual bezel.

6. The computing device of claim 1, wherein the display logic to control the size of the active area based at least in part on an orientation of the touch-sensitive display.

7. The computing device of claim 1, wherein the display logic to cause the touch-sensitive display to display the active button surrounded by the inactive area, the display logic to further cause the touch-sensitive display to perform an operation in response to a touch input to the active button.

8. The computing device of claim 1, wherein the display logic to cause the touch-sensitive display to change a size of the inactive area of the touch-sensitive display based at least in part on execution of an application.

9. The computing device of claim 1, wherein the display logic to cause the touch-sensitive display to change the size of the active area based on an input from the group consisting of a keypad, a touchpad, a key and a touchpoint nub.

10. A method of displaying on a tablet, comprising:
    displaying an active area having a first size on a touch-sensitive display of the tablet, the touch-sensitive display having four edges, a first edge being opposite to the second edge, and a third edge being opposite to the fourth edge;
    detecting detachment of the tablet from a base;
    changing a size of the active area to a second size when the touch-sensitive display changes from a first mode to a second mode, the first mode being a mode in which the tablet is attached to the base, and the second mode being a mode in which the tablet is detected to be detached from the base;
    changing a size of the active area in response to a touch input to a displayed active button that is surrounded by the inactive area, the displayed active button to be at an area adjacent to the first edge; and
    changing a location of the active button to be at an area adjacent the third edge based on a change of orientation of the touch-sensitive display, and the active button to be surrounded by the inactive area of the touch-sensitive display when the active button is at the area adjacent the third edge.

11. The method of claim 10, wherein the first mode comprises a first housing of a base and a second housing of the touch-sensitive display in a coupled configuration, and the second mode comprises the first housing and the second housing in a detached configuration, and the first size of the active area is greater than the second size of the active area.

12. A non-transitory machine readable medium having stored thereon machine readable instructions that, when executed, implement operations to:
    display an active area having a first size on a touch-sensitive display of a tablet the touch-sensitive display having four edges, a first edge being opposite to the second edge, and a third edge being opposite to the fourth edge;
    detect detachment of the tablet from a base;
    change the active area to a second size when the touch-sensitive display changes from the first mode to a second mode, the first mode being a mode in which the tablet is attached to the base, and the second mode being a mode in which the tablet is detected to be detached from the base;
    change a size of the active area in response to a touch input to a displayed active button that is surrounded by the inactive area, the displayed active button to be at an area adjacent to the first edge; and
    change a location of the active button to be at an area adjacent the third edge based on a change of orientation of the touch-sensitive display, and the active button to be surrounded by the inactive area of the touch-sensitive display when the active button is at the area adjacent the third edge.

13. The non-transitory machine readable medium of claim 12, wherein the first mode comprises a first housing of a base and a second housing of the touch-sensitive display in a coupled configuration, and the second mode comprises the first housing and the second housing in a detached configuration.

14. The non-transitory machine readable medium of claim 13, wherein the first size of the active area is greater than the second size of the active area.

15. The non-transitory machine readable medium of claim 12, wherein the inactive area of the touch-sensitive display is a virtual bezel.

16. The non-transitory machine readable medium of claim 12, wherein the operations further to change the size of the active area based at least in part on an orientation of the touch-sensitive display.

17. The non-transitory machine readable medium of claim 12, wherein the operations further to change the size of the active area based at least in part on a touch input to the active area of the touchscreen.

18. The non-transitory machine readable medium of claim 12, wherein the operations further to perform an operation in response to the touch-sensitive display receiving a touch input at the active button that is surrounded by the inactive area.

19. The non-transitory machine readable medium of claim 12, wherein the operations further to change a size of the inactive area of the touch-sensitive display based at least in part on execution of an application.

20. The non-transitory machine readable medium of claim 12, wherein the operations further to change the size of the active area based on an input from the group consisting of a keypad, a touchpad and a touchpoint nub.

* * * * *